US008036346B2

(12) United States Patent
Taylor (10) Patent No.: US 8,036,346 B2
(45) Date of Patent: Oct. 11, 2011

(54) METHOD AND SYSTEM FOR TESTING AUDIO SERVER

(75) Inventor: Kenneth James Taylor, Grass Valley, CA (US)

(73) Assignee: Cisco Technology, Inc., San Jose, CA (US)

( * ) Notice: Subject to any disclaimer, the term of this patent is extended or adjusted under 35 U.S.C. 154(b) by 1629 days.

(21) Appl. No.: 11/301,623

(22) Filed: Dec. 13, 2005

(65) Prior Publication Data

US 2007/0136416 A1 Jun. 14, 2007

(51) Int. Cl.
*H04M 11/00* (2006.01)

(52) U.S. Cl. .................................. 379/88.18; 379/29.02

(58) Field of Classification Search ......... 379/26.01–31, 379/88.01–88.24; 370/352–363; 704/270–278; 709/219, 223
See application file for complete search history.

(56) References Cited

U.S. PATENT DOCUMENTS

| 5,604,771 | A * | 2/1997 | Quiros | 375/326 |
| 5,748,843 | A * | 5/1998 | Peck et al. | 704/276 |
| 5,819,029 | A * | 10/1998 | Edwards et al. | 726/2 |
| 6,108,785 | A * | 8/2000 | Poisner | 726/20 |
| 6,574,657 | B1 * | 6/2003 | Dickinson | 709/203 |
| 6,914,962 | B2 * | 7/2005 | Neary | 379/10.02 |
| 6,961,706 | B2 * | 11/2005 | Saito | 704/275 |
| 7,110,530 | B2 * | 9/2006 | Meynekhdrun | 379/359 |
| 7,266,645 | B2 * | 9/2007 | Garg et al. | 711/133 |
| 7,308,079 | B2 * | 12/2007 | Creamer et al. | 379/27.04 |
| 2002/0076008 | A1 * | 6/2002 | Neary | 379/88.01 |
| 2002/0077819 | A1 * | 6/2002 | Girardo | 704/260 |
| 2003/0212561 | A1 * | 11/2003 | Williams et al. | 704/270.1 |
| 2005/0091234 | A1 * | 4/2005 | Hsu et al. | 707/100 |
| 2005/0129194 | A1 * | 6/2005 | Creamer et al. | 379/88.18 |
| 2006/0025996 | A1 * | 2/2006 | Ju et al. | 704/255 |
| 2006/0047855 | A1 * | 3/2006 | Gurevich et al. | 709/247 |
| 2007/0086432 | A1 * | 4/2007 | Schneider et al. | 370/352 |

FOREIGN PATENT DOCUMENTS

WO  WO 2004023332 A1 *  3/2004

OTHER PUBLICATIONS

William H Press, Brian P Flannery & Saul A Teukolsky, "Article: Random Numbers", Book: Numerical Recipes in C: The Art of Scientific Computing—Second Edition, Copyright 1988-2002, 18 pages, Publisher: Cambridge University Press, United Kingdom.

* cited by examiner

*Primary Examiner* — Simon Sing
*Assistant Examiner* — Assad Mohammed
(74) *Attorney, Agent, or Firm* — Fish & Richardson P.C.

(57) ABSTRACT

A method and system for testing a media server is provided. The media server is capable of delivering prompts simultaneously to a plurality of devices. According to various embodiments, these prompts are present as one or more chunks on the media server. The media server is prepared for testing by generating signatures for each chunk and storing these signatures in a chunk signature database. Thereafter, the testing of the server performed, in which a series of requests are sent to the media server. The media server provides the chunked prompts in response to these requests. These chunked prompts are used to generate signatures, which are compared with the signatures stored in the chunk signature database, to verify whether the media server is operating correctly.

27 Claims, 7 Drawing Sheets

METHOD AND SYSTEM FOR TESTING AUDIO SERVER

BACKGROUND OF THE INVENTION

1. Field of Invention

Embodiments of the invention generally relate to media servers for delivering media-based services. More specifically, various embodiments of the invention relate to testing media servers.

2. Description of the Background Art

The use of packet-based networks, in particular Voice over Internet Protocol (VoIP) networks, has increased in the last decade. Further, service providers have been striving to provide improved service and value-added features to their customers. They provide services, such as text messaging, Voice Mail (VM) and Interactive Voice Response (IVR), among others.

Nowadays, these services are increasingly being used for complex applications. For example, an IVR server may be used to collect responses from viewers of a television quiz contest, which would award the first hundred correct responses. When the telephone number is flashed on the television, the telephone lines are simultaneously opened for accepting the viewers' responses. Thereafter, the IVR server works at or near its maximum capacity of the total number of calls that it can handle. This puts the software infrastructure of the server under a lot of stress, since it has to differentiate between the responses of the various viewers and accordingly provide the correct prompts to the viewers. However, it is not always easy to verify whether the correct and complete prompts were provided to all the viewers. According to another example, a voice mail server may be used to collect and replay voice mails in an office. In this case, the number of prompts being provided by the voice mail server may be very large. These prompts may include digits like 'one', 'two', 'fifty'; and menus like 'press one to delete mail'. These prompts may become complex if two or more prompts are combined, for example 'you have', 'thirty five', 'new mail messages'. In addition, each user may have an option to change his prompts. Furthermore, if the office employs people from different regions of the world, the server may be required to provide the prompts in more than one language, which causes the number of prompts to increase manifold. If a majority of these employees reach office after a weekend and access their voice mails, the number of requests reaching the server may be very large, causing the voice mail server to work at or near its maximum capacity, where the performance of the server may start deteriorating. Therefore, simulators are used to test these servers for reliable operation and measure the point wherefrom they break down.

According to a conventional method of testing, the prompts are replaced with unique tone sequences. These tone sequences enable the simulator to identify the prompt. However, these tone sequences are meaningless for the test engineer configuring or verifying the simulator. In light of this, the testing becomes cumbersome and error-prone.

According to another conventional method, unique tone sequences are added on to the end of the prompts. While this technique solves the problems arising in the previous method, it gives rise to two new problems. The special prompts are now longer than the original prompts, which means the performance of the server in actual conditions may not be completely ascertained. In addition, since there is no verification of the portions of the prompts that did not contain the tones, the simulator is no longer able to verify the original portion of the prompt. Therefore, problems in the server's playback mechanism might go unnoticed and uncorrected.

According to another conventional scheme, speech or pattern recognition techniques may be used. The incoming prompt is digitally processed and then compared with a collection of patterns to match the prompt. These techniques are computationally intensive and therefore, require larger processing and memory infrastructure.

According to still another conventional scheme, a brute-force comparison of each prompt is carried out. In this scheme, the simulator maintains copies of all prompts and a pre-specified sequence in which the server will send the prompts. The prompts received are systematically compared against the expected prompts to verify the performance of the server. However, the required computational effort increases considerably if the prompts received are fragmented as the server is pushed to work up to its maximum limits. In such a case, the simulator's performance measuring criteria may not be accurate.

DETAILED DESCRIPTION OF EMBODIMENTS OF THE INVENTION

Embodiments of the invention provide a method and a system for testing media servers, such as voice mail servers, interactive voice response servers and other servers that serve a number of client devices. In the description herein for embodiments of the present invention, numerous specific details are provided, such as examples of components and/or methods, to provide a complete understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

In accordance with the invention, a simulator uses a novel application of a signature analysis technique to verify the media server's prompts. The media server may have a plurality of prompts that are naturally divided into chunks. In this case, embodiments of the invention employ a preparation process that produces a signature for each of these chunks. In another case, the media server prompts are not naturally chunked. In this case, the embodiments of the invention provide a preparation process that produces new versions of the prompts. These new versions of the prompts are substantially equivalent to the original prompts. However, they have been modified to delimit the chunks. Thereafter, signatures are produced for all prompt chunks and then passed to the simulator for testing.

To test the server, the simulator sends a number of requests to the media server. In response to these requests, the media server provides certain chunked prompts. The simulator generates a signature for each received chunk. These signatures are used to identify the corresponding prompt and therefore, verify the correct operation of the media server.

Figure 1:
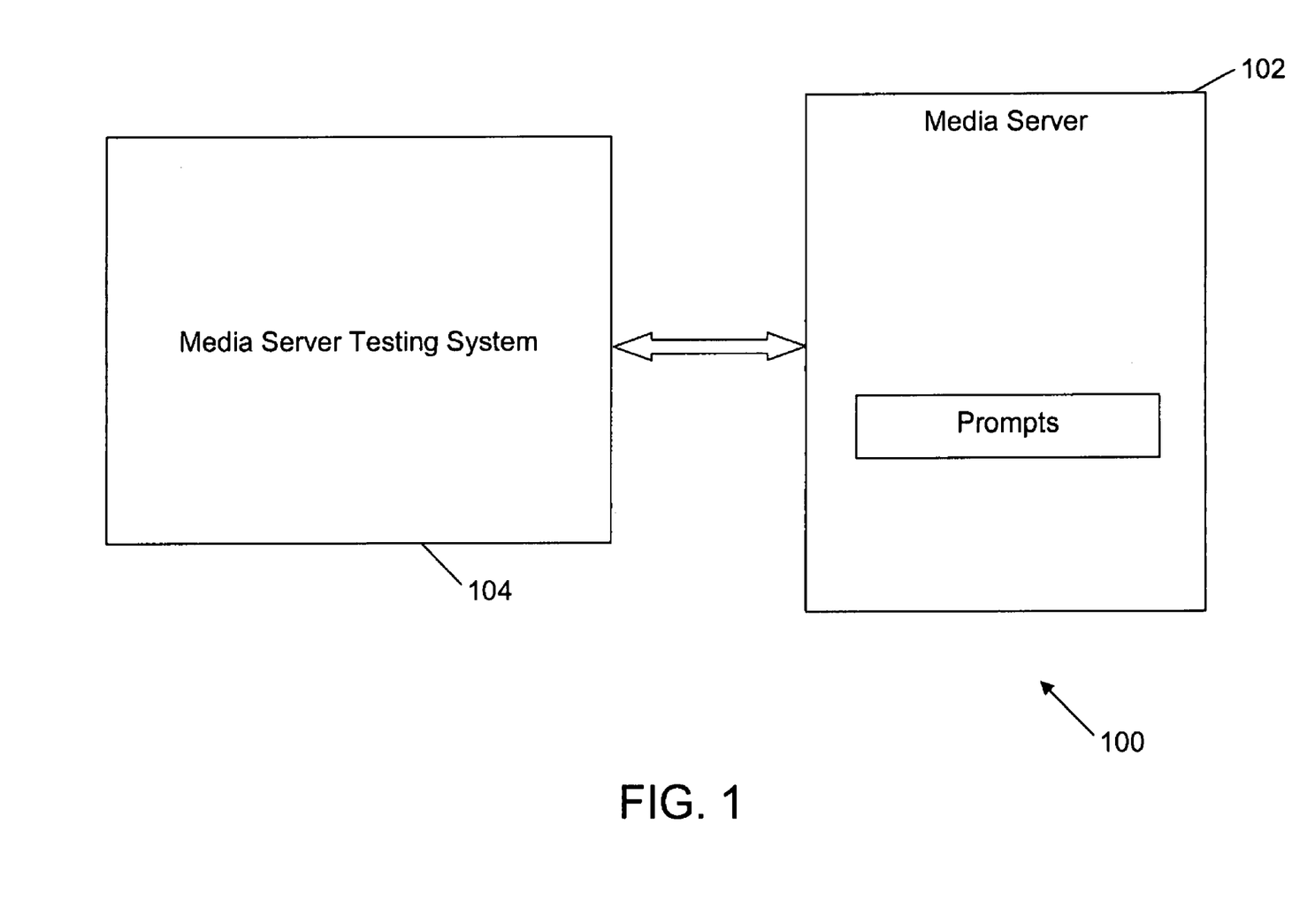
FIG. 1 illustrates an environment for testing a media server, in accordance with an embodiment of the invention.

Referring now to the drawings, particularly by their reference numbers, FIG. 1 illustrates an environment 100 for testing a media server 102, in accordance with an embodiment of the invention. Environment 100 includes media server 102 and a media server testing system 104. Examples of media server 102 include a voice mail server, and an interactive voice response (IVR) server. Media server 102 is designed to handle a large number of requests and provide prompts in response to these requests. Media server testing system 104, which simulates many client devices that request prompts from media server 102, is used to test media server 102. Media server testing system 104 determine the maximum simultaneous requests to which media server 102 provides correct and complete prompts. Alternatively, media server testing system 104 may be operated as a single client device that is used to verify operation of media server 102 by requesting prompts during normal operation under varying load conditions.

Figure 2:
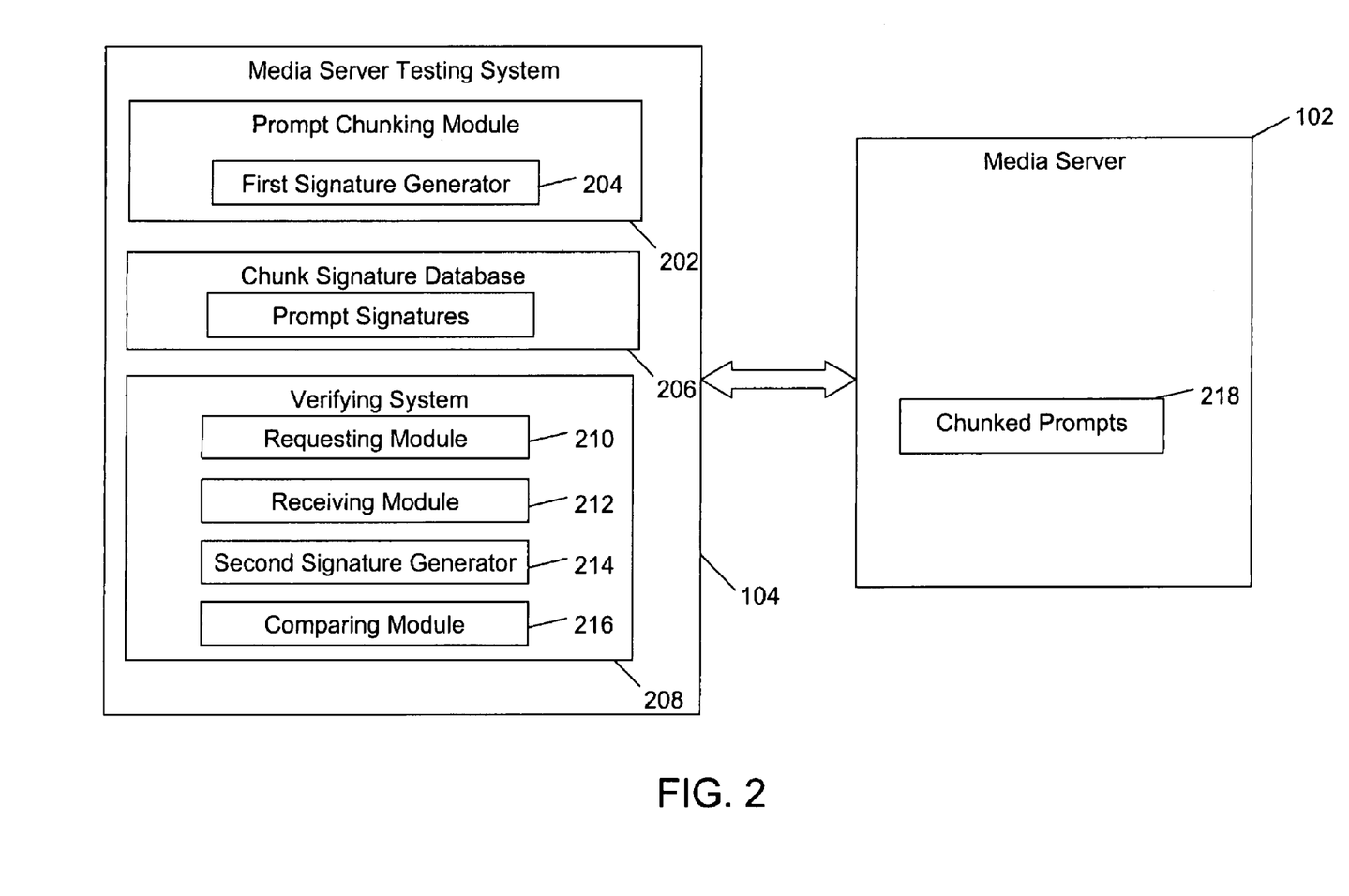
FIG. 2 is a block diagram, depicting a media server testing system for testing media server, in accordance with an embodiment of the invention.

FIG. 2 is a block diagram, depicting a media server testing system 104 for testing media server 102, in accordance with an embodiment of the invention. Media server 102 comprises chunked prompts 218 that are stored in a non-volatile memory. For example, in case of MPEG (Moving Picture Experts Group) and other video prompt representations, the prompts are naturally divided into frames. These frames are used as the chunks in one embodiment. In an alternative embodiment, audio prompts, that lack natural delimiters, are first divided into chunks. Media server testing system 104 comprises a prompt chunking module 202, and a chunk signature database 206 for preparing media server 102. The preparation process uses a first signature generator 204 to create signatures for each chunk of the prompts. First signature generator 204 uses a linear feedback shift register to generate these signatures. In one embodiment, the preparing process is incorporated into the server's normal software release process, to ensure that the chunked signature database is prepared in a reliable manner that is also independent of the system to be tested. Chunk signature database 206 stores these signatures. Each signature is typically unique, but as can be envisioned, the preparation process may generate an identical signature for two or more chunks. Identical signatures are more likely to occur if the number of chunks is large compared to the number of unique values that may be represented in the linear feedback shift register, or whenever chunks happen to contain the same bit-patterns. Therefore, the chunk signature database 206, must support the introduction of multiple chunks belonging to different prompts, each with the same signature.

Media server testing system 104 starts testing media server 102 after the preparation process is complete. Media server testing system 104 comprises a verifying system 208 for testing media server 102. Verifying system 208 comprises a requesting module 210, a receiving module 212, a second signature generator 214 and a comparing module 216. Requesting module 210 sends a large number of requests to media server 102 for selected prompts. This simulates the actual working of media server 102, where media server 102 has to respond to a large number of client devices. Receiving module 212 receives the chunks corresponding to the selected prompts sent by media server 102. Second signature generator 214 is used to generate signatures for each chunk in the received chunked prompts. Second signature generator 214 uses the same method for generating the signatures as used by first signature generator 204. In an embodiment, second signature generator 214 may not be present and verifying system 208 uses first signature generator 204 for generating the signatures. Thereafter, comparing module 216 compares the signatures of the received chunks of each response with the signatures in chunk signature database 206. The signature of the received chunk may correspond to two or more chunks in chunk signature database 206. In this case, chunk signature database 206 returns the value of the first matching chunk along with a flag. The flag indicates the existence of multiple chunks with the same signature. In this case, a unique prompt is identified when the sequence of received chunks matches the sequence of chunks in the selected prompt. This verifies the receipt of the prompt that was sent by media server 102, thereby verifying the correct operation of media server 102.

Figure 3:
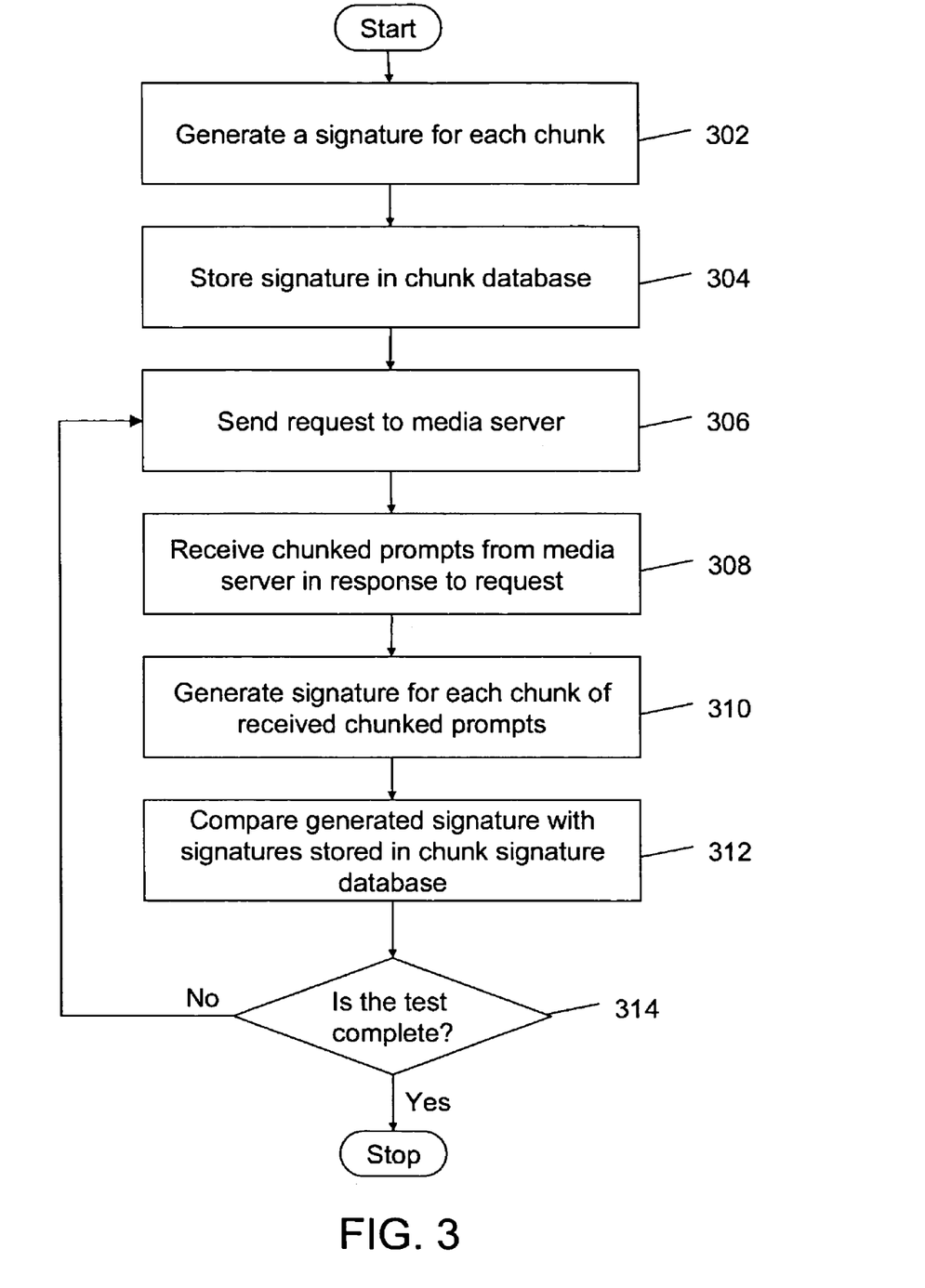
FIG. 3 is a flowchart, depicting a method for testing media server, in accordance with an embodiment of the invention.

FIG. 3 is a flowchart, depicting a method for testing media server 102, in accordance with an embodiment of the invention. Media server 102 has prompts that are divided into chunks. Before starting the testing, media server 102 has to be prepared. This preparation process starts at step 302. In this step, first signature generator 204 present in prompt chunking module 202 generates signatures for each of these chunks. This process is necessarily reliable, and independent of the system being tested. First signature generator 204 uses a linear feedback shift register to generate these signatures. The details of the register are explained later is conjunction with FIG. 4. At step 304, these signatures are stored in chunk signature database 206. This completes the preparation process.

Thereafter, media server testing system 104 is ready for testing media server 102. Verifying system 208 can now start verifying correct operation of media server 102. At step 306, requesting module 210 sends a large number of requests to media server 102. These requests simulate the requests that media server 102 receives from a plurality of client devices (not illustrated) in its actual working conditions. In response to these requests, media server 102 sends chunked prompts to verifying system 208. At step 308, these chunked prompts are received by receiving module 212. These chunked prompts are communicated in a manner that they are not altered by normal and correct operation of the server, as any modification to the chunks will alter the resulting signature and prevent the detection of the prompt. At step 310, signatures are generated for each chunk in the received chunked prompts. These signatures are generated by second signature generator 214, using linear feedback shift register. At step 312, these generated signatures are compared with the signatures stored in chunk signature database 206 to ascertain the prompts associated with the received chunks. If the received chunk is same as the expected chunk, the correct operation of media server 102 is verified. At step 314, a decision is taken regarding the completion of the test. The test is considered complete, if the test produces satisfactory results. On the other hand, if the test is not complete, it is repeated from step 306.

Figure 4:
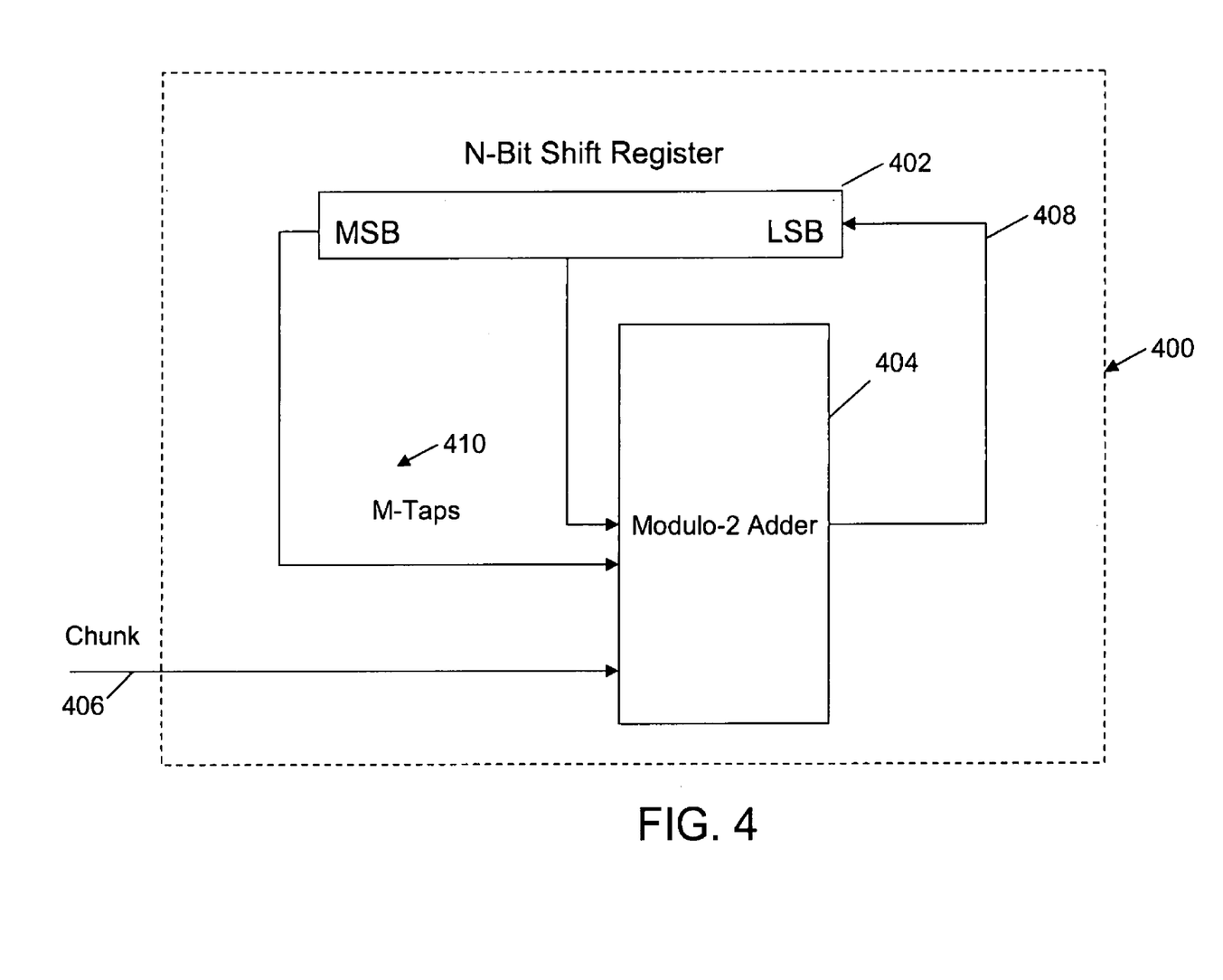
FIG. 4 illustrates a method for generating expected signatures using a linear feedback shift register (LFSR), in accordance with an embodiment of the invention.

FIG. 4 illustrates a method for generating chunk signatures using a linear feedback shift register (LFSR) 400, in accordance with an embodiment of the invention. An N-bit shift register 402 and a modulo-2 adder 404 are used to generate the signature for a chunk 406. The value of N should be chosen in such a manner that the maximum number of unique chunk signatures used for any test is a small percentage of the total number of unique values that may be held in the shift register 402. This increases the probability of generating a unique signature for each chunk. For example, a test server, with several hundred thousand unique chunk signatures should use a shift register with 32 or more bits, thus increasing the probability that a unique signature is generated for each chunk 406. In an exemplary embodiment, the value of N is 32, and the bits of shift register 402 are represented as $a_{0(LSB)}, a_1, a_2, \ldots, a_{31}(MSB)$. Starting with all shift register 402 bits reset, each bit of the chunk 406 is applied to LFSR 400 sequentially at modulo-2 adder 404. In addition 'M' taps 410 from shift register 402 are also applied to modulo-2 adder 404. The result 408 from modulo-2 adder 404 is shifted into the shift register 402 at bit $a_0$, the bit at $a_0$ is shifted to $a_1$, the bit in $a_1$ is shifted to $a_2$, and so on. The 'M' taps 410 are chosen to produce a maximum length sequence as described in 'Numerical Recipes in C', section titled "Generation of Random Bits". This process makes the next input to modulo-2 adder 404 dependent upon the next bit from the chunk 406 and the preceding state maintained in shift register 402. The process is repeated until all bits from chunk 406 have been processed. Thereafter, the signature for chunk 406 can be read from the N bits of shift register 402. In a preferred software embodiment of the LFSR, a lookup table allows eight bits of the chunk to be processed at a time, thus providing an efficient implementation of the described functionality.

In another embodiment of the invention, the prompts present in media server 102 are not initially stored in a chunked format. For example, in the case of PCM audio data, where the prompts are not naturally divided into chunks, the preparation process divides the prompts into chunks before producing signatures for the chunks. The media server's initial prompts are then replaced with the resulting chunked prompts.

In yet another embodiment, other schemes are selected to generate unique signatures for each chunk. To illustrate, a cyclic redundancy check (CRC), or software hash scheme could be used to generate the signature.

Figure 5:
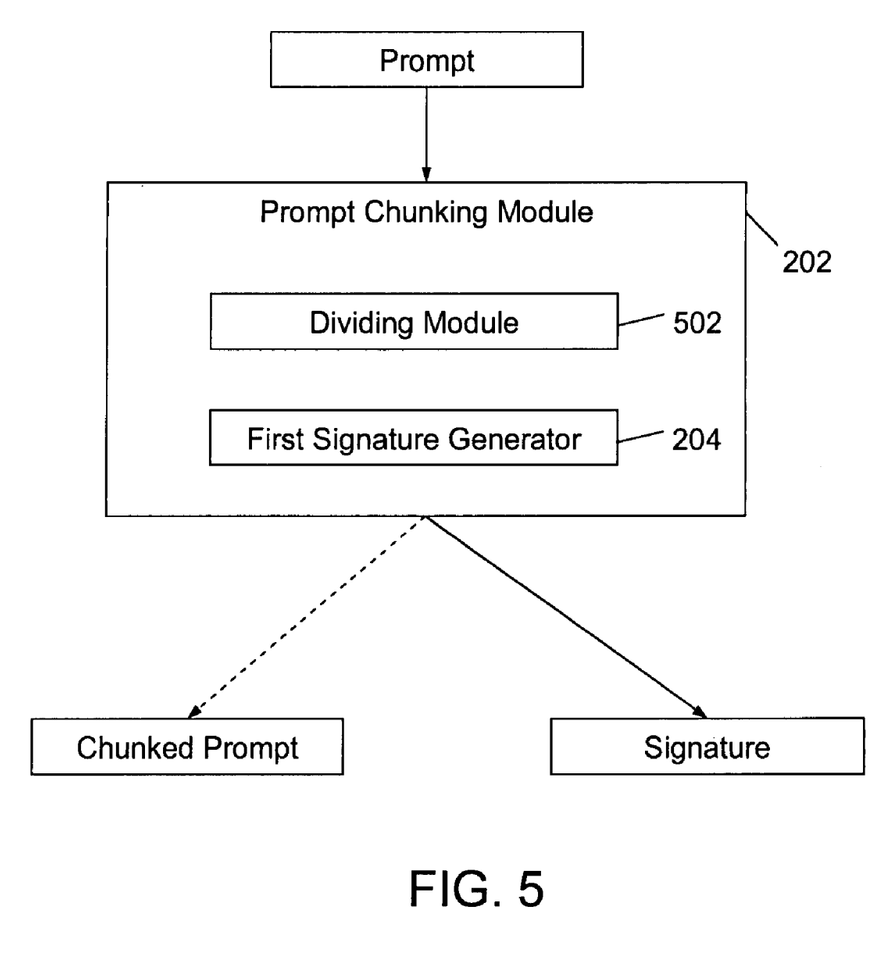
FIG. 5 is a block diagram, depicting a prompt chunking module used to divide the prompts into chunks and generate corresponding signatures, in accordance with an embodiment of the invention.

FIG. 5 is a block diagram of a prompt chunking module 202 that is used to divide the prompts into chunks and to generate corresponding signatures, in accordance with an embodiment of the invention. In addition to first signature generator 204, prompt chunking module 202 comprises a dividing module 502 that is capable of dividing the prompts of media server 102 into one or more chunks. Since digital media data is communicated in packets, which are the smallest unit of information, a preferred embodiment of the dividing module 502 divides the prompts into chunks, based on the size of the packets that will be used. The size of the chunk is generally chosen to be less than or equal to half the size of a packet. For example, if the packet size is 160 bytes, the chunks are divided into 80 byte-size packets or less than 80-bytes. This ensures that at least one complete chunk is present in every packet. As in the above example, if there are two prompts of length 172 and 160 bytes each, the first prompt is divided into three chunks of 80, 80 and 16 bytes each and the second chunk is divided into two chunks of 80 bytes each. Now, the first packet will contain the first and second chunks of the first prompt. And the second packet will contain the third chunk of 16 bytes of the first prompt and the first chunk of 80 bytes of the second prompt. The second chunk of the second prompt is divided between the second and the third packet. Therefore, it is clear that by dividing the prompts into chunks that are equal to or less than half the size of the packet size, it is ensured that at least one complete chunk is present in a packet. Moreover, it is also ensured that at least one complete chunk, from any prompt with two or more chunks, is sent in the same packet. Larger chunk sizes may be used, but will increase the minimum number of consecutive packets required to identify some prompts. Smaller chunk sizes may be used, but will increase the total number of signatures.

After dividing module 502 has generated the chunks, first signature generator 204 generates signatures for the chunks produced by dividing module 502.

Figure 6:
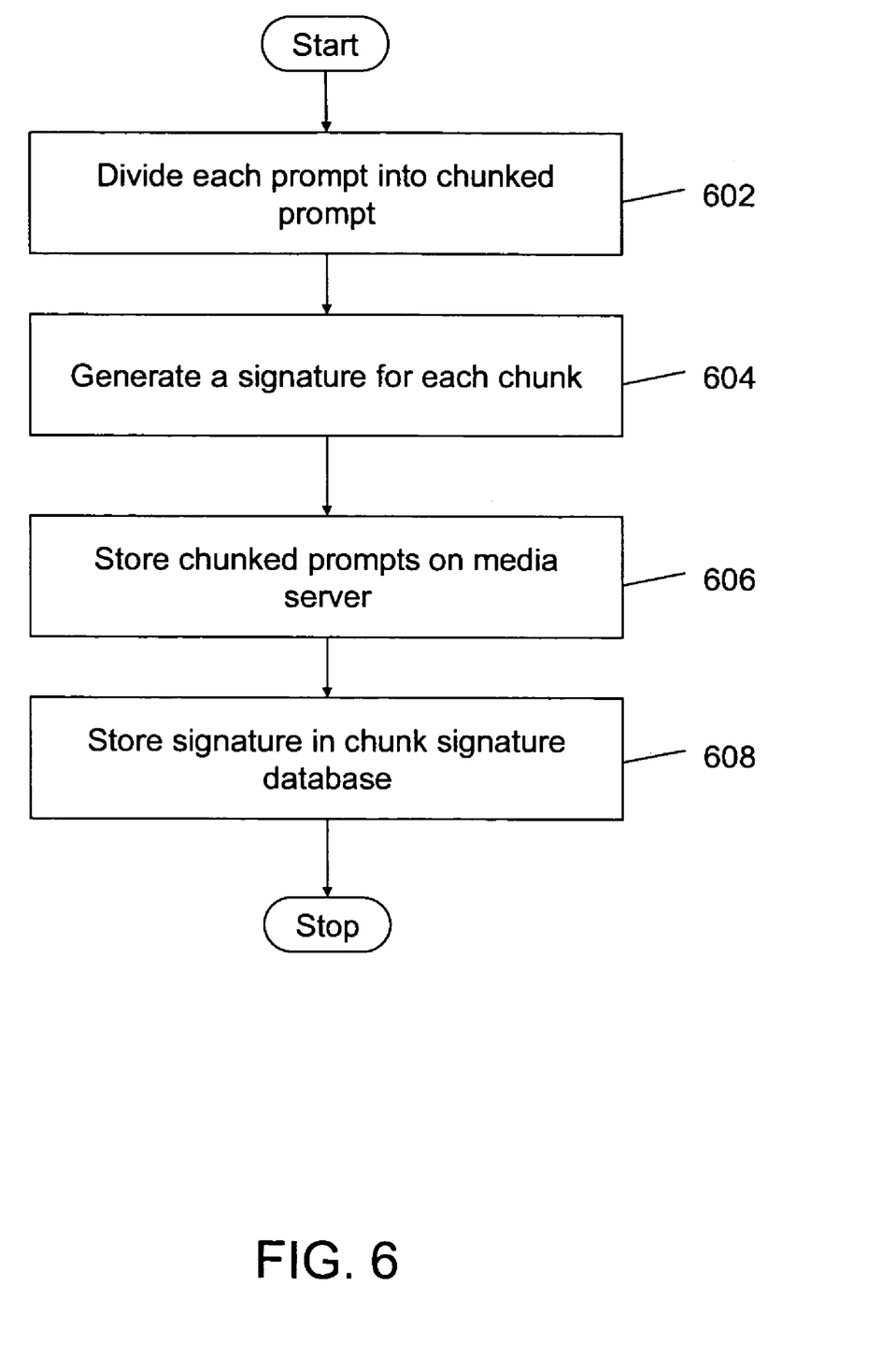
FIG. 6 is a flowchart, depicting a method for creating chunked prompts, in accordance with an embodiment of the invention.

FIG. 6 is a flowchart, depicting a method for creating chunked prompts, in accordance with an embodiment of the invention. At step 602, dividing module 502 divides the prompts into one or more chunks. As mentioned earlier, the division of the prompts into chunks is optimally based on the size of the packets through which the chunks are communicated between media server 102 and media server testing system 104. To define a chunk, dividing module 502 manipulates the data in the prompt at regular intervals to insert special bit pattern, called a 'flag'. These patterns are chosen with a concern for the prompt encoding and have the following characteristics:
  a) The pattern is not likely to occur naturally in the original prompt.
  b) Adding the pattern to the prompt at regular intervals does not noticeably affect the quality or length of the prompt.
  c) Removing any naturally occurring instances in the pattern at non-regular intervals does not noticeably affect the quality or length of the prompt At step 604, first signature generator 204 generates a signature for each of these chunks. First signature generator 204 uses a linear feedback shift register to generate the signatures. When all the prompts of the server have been processed in this manner, the chunked prompts are stored on media server 102 at step 606. The chunked prompts replace the original prompts of media server 102. At step 608, the corresponding chunk signatures are stored in chunk signature database 206, thus completing the preparation process.

Figure 7:
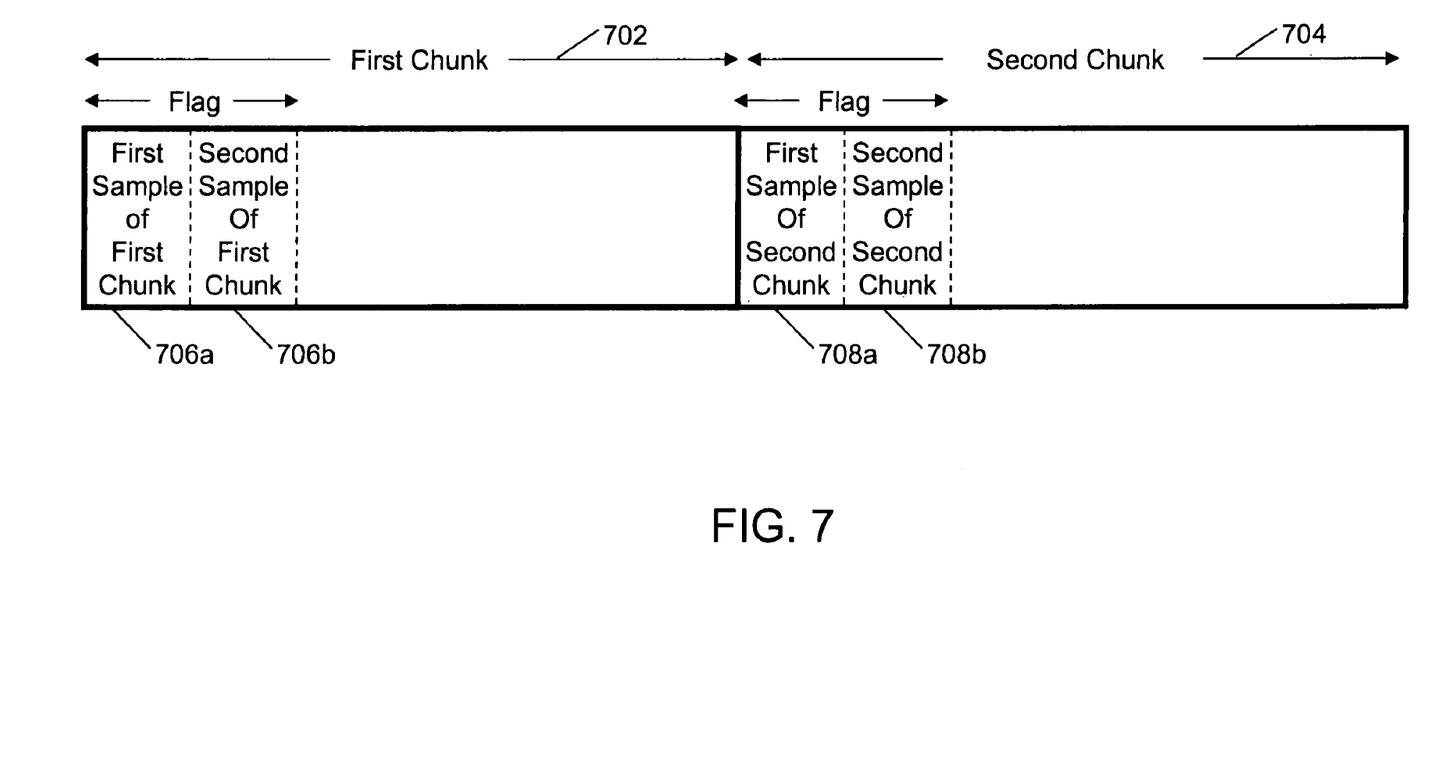
FIG. 7 illustrates the division of a prompt into one or more chunks, in accordance with an embodiment of the invention.

FIG. 7 illustrates the division of a prompt into one or more chunks, in accordance with an embodiment of the invention specifically targeting sampled prompts. The prompt is divided into a first chunk 702 and a second chunk 704. The chunks are comprised of one or more samples. According to various embodiments of the invention, a sample may have different lengths, for example, 8, or 16 bits. A first sample 706a is the starting boundary of first chunk 702. Similarly, a first sample 708a is the starting boundary of second chunk 704.

In a preferred embodiment of the invention, applied to sampled audio data, the flag consists of two consecutive samples with the same value. Therefore, first sample 706a is copied onto second sample 706b, to form the flag in first chunk 702. Similarly, first sample 708a is copied onto second sample 708b to form the flag in chunk 704. In addition, the portion of the prompt between two consecutive flags defines a chunk. In this instance, if there are consecutive samples that are identical to each other, one of them is tweaked. This tweaking is carried out in a manner such that no perceptible audio or visual change is made to the chunk. For example, this tweaking can change one or more least significant bits of one of the samples.

Since the chunking and signature generation process does not induce any perceptible change to the prompts, these chunked prompts may be present on media server 102 when it is provided to a customer. At the customer's end, media server 102 is connected to a number of VOIP devices (not shown)

through a network, such as the Internet. When media server 102 receives a request from any of these VOIP devices, it provides these chunked prompts in response to the request in place of the original (that is, non-chunked) prompts. Thus, if media server 102 is required to be tested once it is deployed at the customer's premise, verifying system 208 may also send requests to media server 102 through the network. The prompts received from media server 102 in response to the requests can be analyzed to verify the correct operation of media server 102. In this manner, the real-time testing of media server 102 during its actual working conditions can be carried out. Advantageously, this real-time testing may be done remotely over the network.

According to various embodiments of the invention, first signature generator 204 and second signature generator 214 may use other coding techniques for the generation of signatures, such as cyclic redundancy check (CRC), message digest #4 (MD4), etc. . . . . Regardless of the selected coding technique, care should be taken to ensure that it produces signatures that have a high probability of being unique for any unique bit sequence.

In various embodiments of the invention, other information may also be stored along with the chunks in chunk signature database 206. Other information includes the length of the chunk, offset of the chunk in the prompt, offset of the prompt in chunk signature database 206, etc.

In another embodiment of the invention, verifying system 208 provides a report summarizing the chunks received. The report may include information such as the total number of chunks in the prompt, number of missing chunks, delays between chunks, etc. Verifying system 208 provides all this information along with the number of requests sent to media server 102 so that its performance, with varying number of requests, may be analyzed. Further, if there is more than one type of request, the report may be provided for different combinations of the number and types of requests.

According to another embodiment of the invention, unique signatures are generated for each new chunk of audio prompt that is processed by first signature generator 204. In this case, prompt chunking module 202 compares the newly generated signature with the signatures already stored in chunk signature database 206 during the preparation process. In addition, prompt chunking module 202 also tweaks the chunk to change the signature of any chunk with a generated signature that pre-exists in chunk signature database 206. In an embodiment of the invention, this tweaking comprises randomly changing the least significant bits of one or more samples of the chunk, which changes the corresponding chunk signature. In addition, the tweaking process does not bring about any perceptible change in the original chunk.

In still another embodiment of the invention, the chunks and the prompts along with the expected signatures are stored in chunk signature database 206 with the help of C++ computer programming language structures, which have been exemplified below:

struct chunk_list {
   struct chunk_list *next;
   uint32 prompt_offset:12; /* 4096 prompts max. */
   uint32 chunk_offset:20; /* 1048576 chunks per prompt max. */
}
where,
chunk_list is the structure used to maintain a list of chunks with the same signature; prompt_offset:12 is the offset of the corresponding prompt in an array of "struct prompt" structures; and chunk_offset:20 is the offset of this chunk within that prompt.

struct chunk_sig {
   uint32 sig32;
   struct chunk_list *chunks;
}
where,
chunk sig structure is maintained in an array sorted by their sig32 field; and chunks is a pointer to a linked list of one or more chunk_list records with the corresponding signature.

struct prompt {
   const char *filepath; /* filepath relative to root of prompt hierarchy */
   uint32 chunk_count; /* chunks in this prompt. */
}
where,
prompt structure is maintained in an array of all prompts that comprise the prompt database; filepath is used to uniquely identify the prompt on the media server; and chunk_count indicates the total number of chunks in that prompt. In various embodiments of the invention, chunk signature database 206 may be referred to as chunk dictionary.

Embodiments of the invention provide a method for testing the operation of a media server comprising a plurality of chunked prompts, the method comprising generating a signature for each chunk in the plurality of chunked prompts; storing the signatures in a chunk signature database; verifying the correct operation of the media server, wherein the verifying comprises: sending a request to the media server; receiving one or more chunked prompts in response to the request; generating a signature for each chunk of the received one or more chunked prompts; and comparing the generated signature for each chunk of the received chunked prompts with stored signatures present in the chunk signature database to verify the correct operation of the media server.

According to another embodiment of the invention, a method for testing the operation of a media server is provided. The method comprises a plurality of prompts that are divided into at least one chunk; generating a signature for each chunk; storing the chunked prompts in the media server; storing the signatures in a chunk signature database; verifying the correct operation of the media server, the verifying comprising: sending a request to the media server; receiving one or more chunked prompts from the media server in response to the request; generating a signature for each chunk of the received one or more chunked prompts; and comparing the generated signature for each chunk of the received chunked prompts with the stored signatures present in the chunk signature database to verify the correct operation of the media server.

According to still another embodiment of the invention, a system for testing the operation of a media server is provided. The system comprises a plurality of chunked prompts, the system comprising a prompt chunking module comprising: means for generating a signature for each chunk in the plurality of chunked prompts; a chunk signature database for storing the generated signatures; and a verifying system having the information for linking each signature to a chunk in one of the plurality of chunked prompts, the verifying system comprising means for sending a request to the media server; means for receiving one or more chunked prompts from the media server in response to the request; means for generating a signature for each chunk of the received one or more chunked prompts; and means for comparing the signature for each of chunk of the received chunked prompts with the plurality of signatures stored in the chunk signature database to verify the correct operation of the media server.

According to yet another embodiment of the invention, a verifying system for testing operation of a media server is provided. The verifying system comprises a plurality of chunked prompts, the verifying system comprising means for sending a request to the media server; means for receiving one or more chunked prompts from the media server in response to the request; means for generating a signature for each chunk of the received one or more chunked prompts; and means for comparing the signature for each of chunk of the received chunked prompts with the signatures stored in a chunk signature database, the chunk signature database comprising signatures for the chunks in the received chunked prompts.

According to yet another embodiment of the invention, an apparatus for testing the operation of a media server is provided. The apparatus comprises a plurality of chunked prompts, the apparatus comprising: a processor for executing instructions; and a machine readable medium including instructions executable by the processor comprising one or more instructions for generating a signature for each chunk in the plurality of chunked prompts; one or more instructions for storing the signatures in a chunk signature database; one or more instructions for verifying the correct operation of the media server, wherein the one or more instructions for verifying comprises: one or more instructions for sending a request to the media server; one or more instructions for receiving one or more chunked prompts in response to the request; one or more instructions for generating a signature for each chunk of the received one or more chunked prompts; and one or more instructions for comparing the generated signature for each chunk of the received chunked prompts with stored signatures present in the chunk signature database to verify the correct operation of the media server.

Embodiments of the invention have the advantage that the original prompts, or prompts that are imperceptibly similar to the original prompts, are used for testing so that the actual working conditions are tested. Furthermore, each chunk is independent of other chunks in the prompt. This helps in easy testing, even in the case of loss or corruption of one or more chunks of the prompt. In addition, the signatures are generated only once during the preparation process. Subsequently, these signatures can be used repeatedly for the testing process. Further, embodiments of the invention provide a method that is computationally efficient since it involves the comparison of signatures rather than a bit-wise comparison of the chunks. Therefore, the embodiments of the invention do not require a large-sized memory. Further, embodiments of the invention allow the real-time testing of the media server during its actual working conditions.

Although the invention has been discussed with respect to specific embodiments thereof, these embodiments are merely illustrative, and not restrictive, of the invention.

Although specific protocols have been used to describe embodiments, other embodiments can use other transmission protocols or standards. Use of the terms 'peer', 'client', and 'server' can include any type of device, operation, or other process. The present invention can operate between any two processes or entities including users, client devices, functional systems, or combinations of hardware and software. Peer-to-peer networks and any other networks or systems where the roles of client and server are switched, change dynamically, or are not even present, are within the scope of the invention.

Any suitable programming language can be used to implement the routines of the present invention including C, C++, Java, assembly language, etc. Different programming techniques such as procedural or object-oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

Also in the description herein for embodiments of the present invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

A 'computer' for purposes of embodiments of the present invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions, which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for presenting media via a suitable directly or indirectly coupled input/output (I/O) device, the computer would have suitable instructions for allowing a user to input or output (e.g., present) program code and/or data information respectively in accordance with the embodiments of the present invention.

A 'computer readable medium' for purposes of embodiments of the present invention may be any medium that can contain, store, communicate, propagate, or transport the computer program for use by or in connection with the instruction execution system apparatus, system or device. The computer readable medium can be, by way of example only but not by limitation, an electronic, magnetic, optical, electromagnetic, infrared, or semiconductor system, apparatus, system, device, propagation medium, or computer memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims

What is claimed is:

1. A method for testing, with a media server testing system, operations of a media server, the method comprising:
    dividing, using a media server testing system, a prompt into one or more chunked prompts, wherein the one or more chunked prompts are based on a size of a packet;
    generating, using the media server testing system, a chunk signature for each of the one or more chunked prompts;
    storing the chunk signatures in a memory associated with the media server testing system;
    sending, with the media server testing system, a request to the media server;
    receiving, with the media server testing system, one or more chunked prompts from the media server in response to the request;
    generating, with the media server testing system, a signature for each of the received one or more chunked prompts to define a generated signature;
    for each of the received one or more chunked prompts, comparing the generated signature with the respective chunk signature stored in the memory;
    based on results of the comparison of the generated signature with the respective chunk signature for each of the received one or more chunked prompts, determining whether the generated signatures correctly correspond with the respective chunk signatures stored in the memory; and
    verifying that the media server is operating correctly based on results of the determination of whether the generated signatures correctly correspond with the respective chunk signatures stored in the memory.

2. The method according to claim 1, further comprising:
    dividing each of a plurality of prompts into chunked prompts, wherein the media server comprises the plurality of prompts; and
    storing the chunked prompts on the media server.

3. The method according to claim 2, wherein the storing of the chunked prompts comprises replacing each of the plurality of prompts with the chunked prompts.

4. The method of claim 2, further comprising determining that the one or more chunked prompts are based on the size of the packet.

5. The method of claim 4, wherein determining the size of the packet comprises:
    assessing size information for the packet; and
    regulating information for the packet.

6. The method according to claim 1, further comprising:
    generating, before receiving, a chunk signature for each chunked prompt; and
    storing the chunk signature in the memory, defining a stored generated signature.

7. The method according to claim 6, further including: comparing the generated signature with the stored generated signature; tweaking the chunk if the generated signature matches the stored signature; generating a signature for the tweaked chunk, defining a tweaked signature; and storing the tweaked signature.

8. The method according to claim 7, wherein the tweaking further comprises modifying one or more least significant bits of one of a plurality of samples, wherein the chunk comprises the plurality of samples.

9. The method according to claim 1, wherein the dividing the prompt into one or more chunked prompts further comprises placing a flag at a boundary of a chunked prompt.

10. The method according to claim 9, wherein the flag placing comprises duplicating a sample at the boundary of the chunked prompt, the chunked prompt comprising a plurality of samples.

11. The method according to claim 9, wherein the placing the flag at the boundary of the chunked prompt comprises tweaking a portion of the chunked prompt if the portion comprises the flag.

12. The method according to claim 1 further comprises generating the chunk signature using a linear feedback shift register.

13. The method according to claim 1 further comprises generating the chunk signature using a cyclic redundancy check.

14. The method according to claim 1 further comprises generating the chunk signature using a hash.

15. A system for testing operations of a media server comprising one or more chunked prompts, the system comprising:
 a prompt chunking module comprising:
  a first module for dividing a prompt into one or more chunked prompts, wherein a size of a chunked prompt is based on a packet size; and
  first means for generating a chunk signature from data that defines a chunked prompt included in the one or more chunked prompts, defining a generated signature;
 a chunk signature database for storing the chunk signature; and
 a verifying system comprising:
  a second module for sending a request to the media server;
  a third module for receiving one or more chunked prompts from the media server in response to the request;
  second means for generating a signature for each of the received one or more chunked prompts to define the generated signature; and
  for each of the received one or more chunked prompts, a comparison module for comparing the generated signature with the respective chunk signature stored in the chunk signature database; and
  based on results of the comparison of the generated signature with the respective chunk signature for each of the received one or more chunked prompts, a processor for verifying that the media server is operating correctly by determining whether the generated signatures correctly correspond with the respective chunk signatures stored in memory.

16. The system according to claim 15, wherein the prompt chunking module further comprises means for dividing each of the one or more prompts into chunked prompts, wherein the media server comprises the one or more prompts.

17. The system according to claim 15 wherein the first means for generating generates one or more additional chunk signatures for additional data associated with the one or more chunked prompts and the second module for sending sends one or more additional requests to the media server and the third module for receiving receives additional information corresponding to the one or more chunked prompts in responses to the one or more additional requests and the second means for generating generates, from the additional data, additional signatures, defining one or more additional generated signatures and the comparison module compares the one or more additional chunk signatures with the additional generated signatures.

18. A method for testing, with a media server testing system, operations of a media server, the method comprising:
 dividing, using the media server testing system, a prompt into one or more chunked prompts, wherein the one or more chunked prompts are based on a size of a packet;
 generating, using the media server testing system, a chunk signature for each of the one or more chunked prompts;
 storing the chunk signatures in a memory associated with the media server testing system;
 sending, with the media server testing system, a plurality of requests to the media server;
 receiving, with the media server testing system, one or more chunked prompts from the media server in response to the request;
 generating, with the media server testing system, a signature for each of the received one or more chunked prompts to define a generated signature;
 for each of the received one or more chunked prompts, comparing the generated signature with the respective chunk signature stored in the memory;
 based on results of the comparison of the generated signature with the respective chunk signature for each of the received one or more chunked prompts, determining whether the generated signatures correctly correspond with the respective chunk signatures stored in the memory; and
 verifying that the media server is operating correctly based on results of the determination of whether the generated signatures correctly correspond with the respective chunk signatures stored in the memory.

19. The method according to claim 18 further comprising:
 dividing each of a plurality of prompts into chunked prompts, wherein the media server comprises the plurality of prompts; and
 storing the chunked prompts on the media server.

20. The method according to claim 19, wherein the storing of the chunked prompts comprises replacing each of the plurality of prompts with the chunked prompts.

21. The method according to claim 19, wherein the dividing each of the plurality of prompts further comprises placing a flag at a boundary of each of the chunked prompts.

22. The method according to claim 21, wherein the flag placing at a boundary of a chunked prompt comprises duplicating a sample at the boundary of the chunked prompt, the chunked prompt comprising a plurality of samples.

23. The method according to claim 21, wherein the placing the flag at a boundary of a chunked prompt comprises tweaking a portion of the chunked prompt if the portion comprises the flag.

24. The method according to claim 18 further comprising:
 generating, before receiving, a chunk signature for each chunked prompt; and
 storing the chunk signature in the memory.

25. The method according to claim 18, wherein the signature storing comprises:
 comparing the signature with the stored signature present in the chunk signature database;
 tweaking the chunk if the signature exists in the chunk signature database; and
 generating a signature for the tweaked chunk; and storing the generated signature.

26. The method according to claim 18 further comprises generating the chunk signature using a linear feedback shift register.

27. A system for testing operations of a media server comprising one or more chunked prompts, the system comprising:
 a prompt chunking module including a processor for dividing a prompt into one or more chunked prompts, wherein the one or more chunked prompts are based on a size of a packet; and
 a computer processor including one or more instructions, that when executed by the computer processor cause the computer processor to perform operations including:
  generating a chunk signature for each of the one or more chunked prompts;
  storing the chunk signature in a chunk signature database associated with the system;
  sending a request to a media server;
  receiving one or more chunked prompts from the media server in response to the request;

generating a signature for each of the one or more chunked prompts that define a generated signature;

for each of the received one or more chunked prompts, comparing the generated signature with the respective chunk signature present in the chunk signature database;

based on results of the comparison of the generated signature with the respective chunk signature for each of the received one or more chunked prompts, determining whether the generated signatures correctly correspond with the respective chunk signatures stored in the chunk signature database; and verifying that the media server is operating correctly based on results of the determination of whether the generated signatures correctly correspond with the respective chunk signatures stored in the chuck signature database.

* * * * *

UNITED STATES PATENT AND TRADEMARK OFFICE
CERTIFICATE OF CORRECTION

| | | |
|---|---|---|
| PATENT NO. | : 8,036,346 B2 | Page 1 of 1 |
| APPLICATION NO. | : 11/301623 | |
| DATED | : October 11, 2011 | |
| INVENTOR(S) | : Taylor | |

It is certified that error appears in the above-identified patent and that said Letters Patent is hereby corrected as shown below:

Title page 1, Item (54) and Col. 1, please correct the title of the invention to read

--METHOD AND SYSTEM FOR TESTING MEDIA SERVER--.

Signed and Sealed this
Twenty-first Day of February, 2012

David J. Kappos
*Director of the United States Patent and Trademark Office*